H. C. BEHR.
CLUTCH MECHANISM FOR WINDING OR HAULING ENGINES.
APPLICATION FILED AUG. 5, 1909.
1,012,188.
Patented Dec. 19, 1911.
3 SHEETS—SHEET 3.
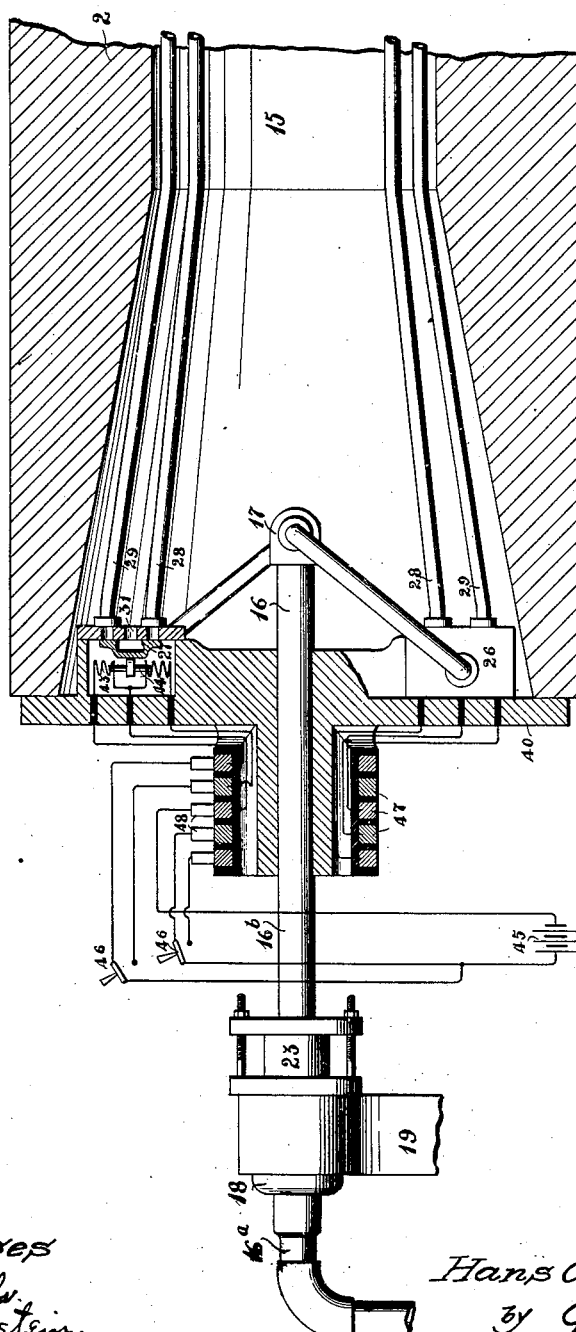
Witnesses
E. Jacobs
R. Goodstein
Inventor
Hans Charles Behr
by B. Singer
atty

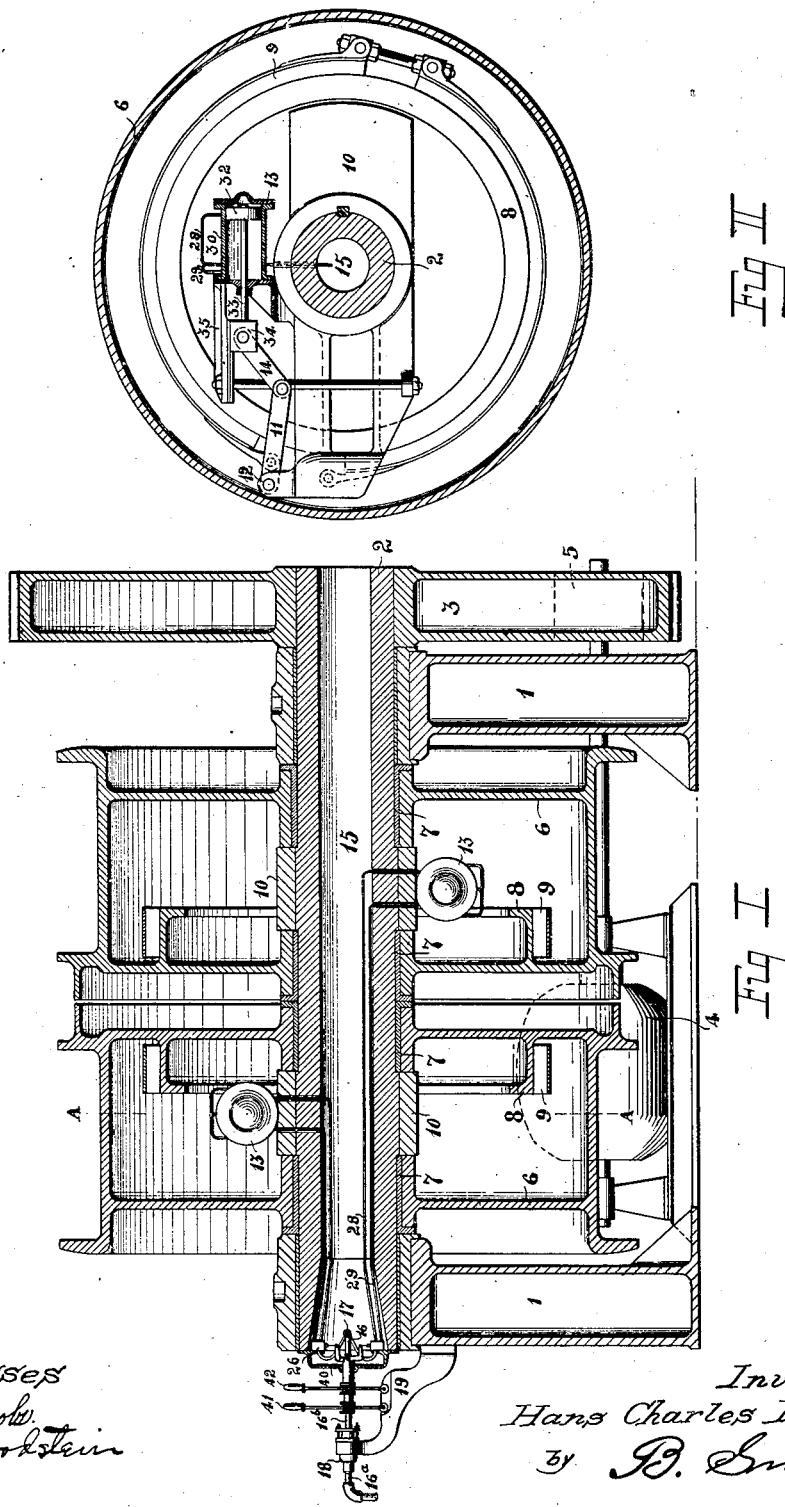

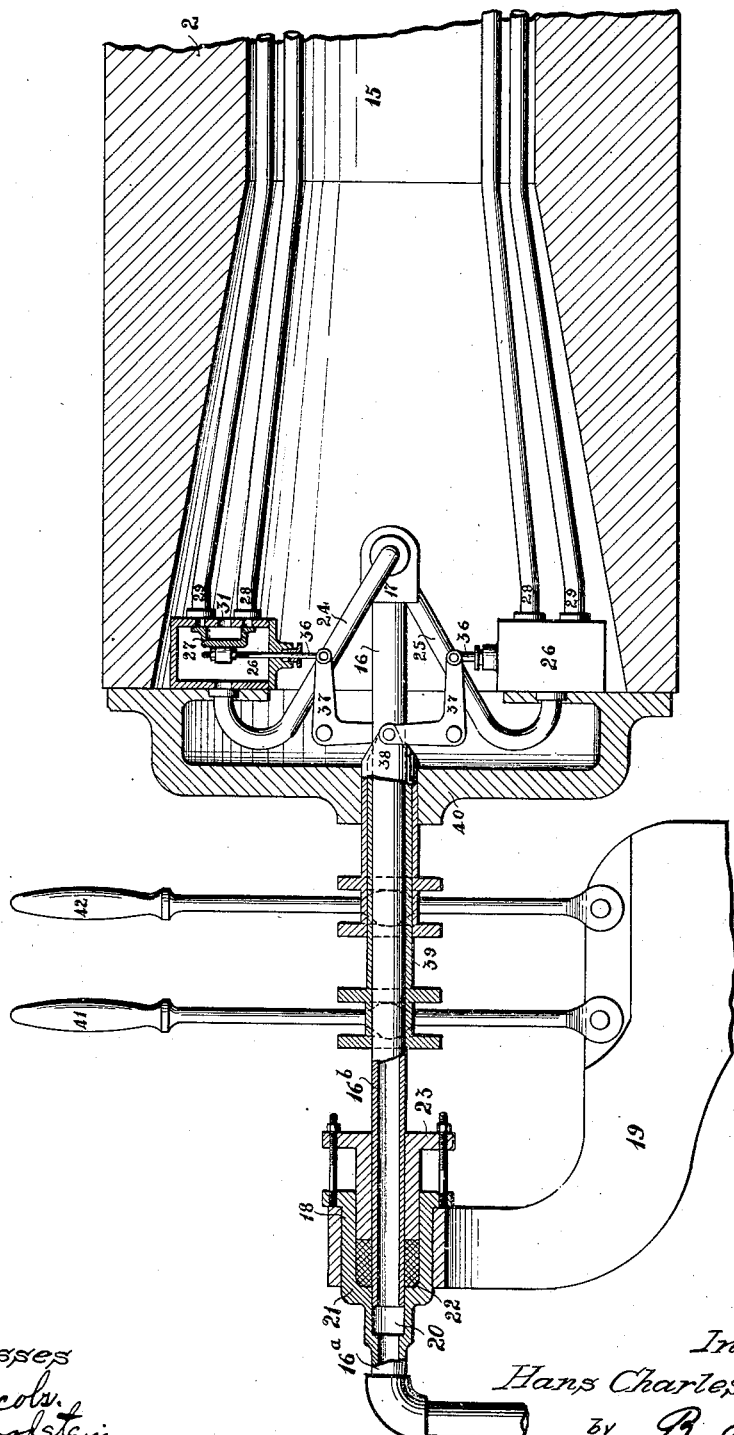

UNITED STATES PATENT OFFICE.

HANS CHARLES BEHR, OF JOHANNESBURG, TRANSVAAL.

CLUTCH MECHANISM FOR WINDING OR HAULING ENGINES.

1,012,188.   Specification of Letters Patent.   Patented Dec. 19, 1911.

Application filed August 5, 1909. Serial No. 511,387.

*To all whom it may concern:*

Be it known that I, HANS CHARLES BEHR, consulting mechanical engineer, a citizen of the United States of America, and residing at Consolidated Goldfield's Building, Johannesburg, Transvaal, have invented certain new and useful Improvements in Clutch Mechanism for Winding or Hauling Engines, of which the following is a specification.

The present invention relates to winding or hauling engines having loose drums adapted to be clutched to a driving shaft or other driving element, and in which power mechanism for operating the clutches is mounted upon and revolves with the driving element or the drums, so that said mechanisms may for example be contained within the drums in order to economize space. A winding engine of this type embodying the present improvements is shown in the accompanying drawings, Figure I being a longitudinal section, Fig. II a transverse section on plane A—A Fig. I, Fig. III an enlarged detail view of the distributing valve mechanism hereafter described, and Fig. IV a similar view of an alternative arrangement.

1 indicates the engine frame carrying the driving shaft 2. To the latter is keyed a spur wheel 3, driven by the motor 4 and the pinion 5.

6, 6, are drums mounted for rotation on the shaft by means of bearings 7. Each drum is formed internally with a clutch wheel 8 which is encircled by a clutch band 9 secured at one end to a clutch driver 10 keyed to the shaft 2, and at its other end to a lever 11 pivoted at 12 to said clutch driver. Upon said driver is also mounted a fluid pressure motor 13 which actuates the clutch lever 11 by means of a link 14 forming a toggle with lever 11.

Heretofore in engines of this type using double acting motors the valve mechanism for distributing the actuating fluid to the several clutch motors 13 has not been arranged to revolve with the drum shaft, but has been mounted upon a fixed part external of the engine, and from said valve mechanism two separate pipes were carried to each motor. As such pipes must pass to the motors through an axial aperture 15 in the shaft 2 and must each consist of fixed and moving parts suitably jointed together, complication has arisen owing to the multiplicity of such joints; while only one drum could in practice be mounted upon each shaft. In other cases single acting motors were used for actuating the clutches, which were only moved to engagement by fluid pressure. The releasing movement of the clutch was effected by means of a spring which however is in certain respects an undesirable feature. The present invention overcomes these difficulties and enables two or more double acting and independent clutch motors to be successfully employed upon the same shaft by mounting the distributing valve mechanism to move with the clutch motors, so that for any number of loose drums only one jointed conveying pipe is necessary.

Referring to the drawings, 16 indicates the fluid inlet pipe divided into the external fixed part 16$^a$ leading from the source of supply, and the movable part 16$^b$ which is rigidly mounted in an axial position in the shaft 2 by means of a junction box 17. For the purpose of swivel-jointing the parts of the pipe together, part 16$^a$ is secured to a terminal fitting 18, which is carried by a bracket 19 on the engine framing and consists of a chamber 20, a stuffing box 21 holding packing 22, and a gland 23. The free end of the part 16$^b$ passes through the stuffing box to fit into chamber 20. From the junction box, branch pipes 24 and 25 connect to the valve chambers 26 which are two or more in number in accordance with the number of loose drums 6. In each valve chamber 26 is a valve 27 controlling the pipes 28 and 29 respectively which lead to opposite ends of the cylinder 30 of the motor 13.

31 is an exhaust port from which the actuating fluid, usually compressed air, passes away.

32 is the piston, 33 the piston rod and 34 the cross head of the clutch operating motor 13, the cross head sliding on a guide 35. To said cross head is connected the above mentioned link 14; the arrangement being such that when fluid is admitted through pipe 28 and exhausted through the pipe 29 the piston 32 is forced out and the clutch band is drawn tight; similarly on the distribution of fluid being reversed by the valve 27 the clutch band is slackened.

The distributing valves 27 may be operated from the exterior by various means. Thus as shown in Figs. I and III the valve spindles 36 are connected by the bell cranks 37 respectively to the sleeves 38 and 39 arranged axially of the shaft 2 and surrounding the pipe 16. Said sleeves are supported by a plate 40 and are engaged severally by the levers 41 and 42 so that either may be moved independently in an axial direction to actuate its corresponding valve. Again in the modification shown in Fig. IV the valves are moved electrically. The construction shown includes for each valve 27 a pair of solenoids 43 coöperating with an iron core 44 formed with the valve said solenoids being operated by a source of current 45 and controlled by a switch 46 which by means of suitable connections including the insulated rings 47 and brushes 48 in contact therewith, enable the valve to be moved in either direction.

While in the above example, a friction clutch of the band type is shown and described, it is to be understood that the invention may be carried out with any other friction, jaw or other clutch suitable for winding or hauling purposes. The necessary structural modifications will be apparent to an engineer and need not be described herein.

It will be understood from the foregoing description that the present invention enables a winding engine to be constructed with any reasonable number of drums mounted upon and adapted to be clutched separately to a single driving shaft; having also fluid actuated clutch motors contained within the drums and having but a single pipe for conveying the actuating fluid from a fixed external source for distributing to the clutch motors. Such an engine is especially adapted for underground work, owing to its comparative simplicity and especially its compactness which reduces the cost of cutting the station to receive it.

What I claim, and desire to secure by Letters Patent is:—

1. In a winding or hauling engine, fluid actuated clutch operating means moving with rotatable parts, valve means controlling the same and moving in rigid relation thereto, a plurality of distributing pipes between the clutch actuating means and the valve means, and a single swivel-jointed pipe for conveying actuating fluid from a fixed source of supply to said valve means.

2. In a winding or hauling engine, a plurality of rotatable parts or members, a fluid actuated clutch mechanism for each, said clutch mechanisms moving with rotatable parts, a single conveying means for conveying actuating fluid from a fixed source for actuating said clutch mechanisms, a valve device maintained in fixed relation to the clutch mechanisms and adapted selectively to distribute the actuating fluid to the several clutch mechanisms.

3. In combination, a driving element, a plurality of rotatable parts, each provided with an independent fluid actuated clutch mechanism for clutching it to the driving element, and a valve device mounted upon the driving element and adapted selectively to distribute the actuating fluid to the several clutch mechanisms.

4. In combination, a driving shaft, a plurality of rotatable parts, each provided with a clutch for clutching it to the shaft, a plurality of fluid actuated means for operating the clutch mechanisms and being rigidly secured to the shaft, adjustable fluid distributing valve means also secured to the shaft, means for supplying actuating fluid thereto from a fixed source, and means mounted upon fixed parts for operating the fluid distributing valve means.

In testimony whereof I affix my signature in presence of two witnesses.

HANS CHARLES BEHR.

Witnesses:
 ALFRED TAYLOR,
 WESLEY E. JOHNS.